United States Patent Office 3,649,592
Patented Mar. 14, 1972

3,649,592
HEAT STABLE POLYPROPYLENE-ASBESTOS MOLDING COMPOSITION
Jean Claude Bernard and Pierre Pascal, Martigues, France, assignors to Naphtachimie, Paris, France
No Drawing. Filed Dec. 4, 1968, Ser. No. 781,251
Claims priority, application France, Dec. 6, 1967, 131,214
Int. Cl. C08f 45/10, 45/58
U.S. Cl. 260—41                         9 Claims

ABSTRACT OF THE DISCLOSURE

A thermally stable composition of polypropylene and asbestos formulated with a stabilizing mixture of a phenol or polyphenol, thiodipropionic acid ester and an organic phosphite, hydrazide, triazole or oxamide.

---

This invention relates to thermoplastic compositions of polypropylene and asbestos having improved tensile and flexural strengths and improved thermal stability.

As described in French Pat. No. 1,327,479, dated June 26, 1962, compositions of polypropylene and anthophyllite asbestos have been prepared containing small quantities of inhibitors to prevent degradation by heat or oxidation. Attempts have also been made to prepare compositions of polypropylene with other varieties of asbestos such as chrysotile, crocidolite and amosite but, until the present invention, compositions of commercial value have not been obtained. One of the reasons has been the inability to achieve sufficient thermal stability.

It is an object of this invention to produce and to provide a method for producing compositions of polypropylene and asbestos which are characterized by high tensile and flexural strengths and good thermal stability.

It has been found that it becomes possible to make use of all types of asbestos, and particularly the crysotile, in the manufacture of thermally stable thermoplastic compositions with polypropylene when use is made of a specific combination of inhibitors in the asbestos-polypropylene system.

In accordance with the practice of this invention, there is produced a composition of high thermal stability, when polypropylene having a crystalline structure is formulated with an asbestos, preferably chrysotile, present in an amount within the range of 10% to 60% by weight, and a stabilizing mixture of a phenol or polyphenol present in an amount within the range of 0.1% to 1% by weight, a thiodipropionic acid ester present in an amount within the range of 0.1% to 1% by weight and a compound selected from the group consisting of organic phosphites, hydrazides, triazoles and oxamides present in an amount within the range of 0.1% to 1% by weight, in which the stabilizing mixture is compatible with the polypropylene and is characterized by low vapor tension at operating temperatures.

Chrysotile asbestos may be present in the composition of this invention in an amount within the range of 10% to 60% by weight and preferably 30% to 45% by weight to provide easily extrudable compositions with maximum rapidity. However, to facilitate extrusion, it is desirable to make use of chrysotile asbestos of short fiber length and preferably as short as possible.

Various phenols or polyphenols can be employed as a component of the stabilizing mixture. For best results it is preferred to make use of molecules having a large stearic area, such as octadecyl - 3 - (3,5 - ditertiobutyl - 4 - hydroxyphenyl) - propionate, 1,3,5 - trimethyl - 2,4,6 - tris- (3,5 - ditertiobutyl - 4 - hydroxyphenyl) - benzene, 4,4'-butylidene - bis - (6 - tertiobutyl - m - cresol), - 1,1,3-tris - (5 - tertiobutyl - 4 - hydroxy - 2 - methylphenyl)-butane, 4,4' - thiobis - (6 - tertiobutyl - m - cresol), tetra-ester obtained from propionic 3-,5-ditertiobutyl-4-hydroxyphenyl) acid and pentaerythritol.

The thiodipropionic acid ester can be illustrated by dilauryl thiodipropionate, butyl stearyl thiodipropionate, benzyl lauryl thiodipropionate, or the like fatty acid ester thiodipropionate.

Suitable organic phosphites are represented by alcoyl, aryl or alcoyl aryl phosphites such as triisodecylphosphite, triphenylphosphite, and trinonylphenyl phosphite. Suitable hydrazides are represented by benzhydrazide and oxaldihydrazide. Benzotriazole is illustrative of a triazole which can be employed while the ozamides can be illustrated by oxanilide.

The compositions of this invention can be prepared by dry mixture of the various ingredients followed by blending in a suitable blender of the type conventionally employed for processing plastics, operating at a temperature above the softening point temperature for the polypropylene. By way of modification, the stabilizing mixture can be incorporated into the polypropylene as a powder for forming into granules, as by extrusion, before combination with the asbestos.

The composition prepared in accordance with the practice of this invention can be shaped or molded with conventional thermoplastic molding or shaping operations and machines, such as by injection molding, extrusion, extrusion-blowing, compression molding and the like.

The following example will illustrate the practice of this invention:

A series of nine different tests were conducted by mixture of the following ingredients in a powder mixture:

Parts by weight
Isotactic polypropylene powder having an intrinsic viscosity of 3.3, as measured in tetraline at 135° C.
  with a fluidity index of 2 (ASTM D.1238–57T)
  (at a temperature of 230° C., 2.160 kg. batch)____ 70
Chrysotile asbestos shorts (commercial type 7 R I) __ 30

The stabilizing system used in admixture with the above and the amounts, given in parts by weight, are set forth in Table I to specify the nine complete formulations.

In each example, the pulverulent mixture was extruded at 220° C. in a double screw coiling extruder and the extruded material was granulated.

Heat stability was measured by placing a test piece, in the form of a plate compression molded at 35 bars and at a temperature of 230° C. of the granules. The heat stability test was made in a ventilated oven maintained at a temperature of 140° C. The life of the test piece is defined as the time at which considerable variation in the fluidity index takes place and at which visual degradation of the surface occurs.

The results are set forth in the following Table I. Tests 4 to 9 are representative of the practice of this invention. Tests 1 to 3 are conducted by way of comparison in which use was made of only two components of the stabilizing system, namely dilauryl thiodipropionate and a phosphite or a phenol.

TABLE I

| Test | Nature of ingredients | Quantities in parts by weight | Life in hours |
|---|---|---|---|
| 1 | Dilaurylthiodipropionate<br>Triisodecylphosphite | 0.50<br>0.50 | <24 |
| 2 | Dilaurythiodipropionate<br>Octadecyl-3-(3,5-ditertiobutyl-4-hydroxyphenyl)-propionate | 0.25<br>0.25 | 95 |
| 3 | Dilaurylthiodipropionate<br>1,3,5-trimethyl-,2,4,6-tris-(3,5-ditertiobutyl-4-hydroxyphenyl)-benzene | 0.50<br>0.40 | 295 |
| 4 | Dilaurylthiodipropionate<br>Octadecyl-3-(3,5-ditertiobutyl-4-hydroxyphenyl)-propionate<br>Triisodecylphosphite | 0.25<br>0.25<br>0.25 | 300 |
| 5 | Dilaurylthiodipropionate<br>1,3,5-trimethyl-2,4,6-tris(3,5-ditertiobutyl-4-hydroxyphenyl)-benzene<br>Triisodecylphosphite | 0.50<br>0.40<br>0.50 | 400 |
| 6 | Dilaurylthiodipropionate<br>1,3,5-trimethyl-2,4,6-tris(3,5-ditertiobutyl-4-hydroxyphenyl)-benzene<br>Benzhydrazide | 0.50<br>0.40<br>0.50 | 450 |
| 7 | Dilaurylthiodipropionate<br>1,3,5-trimethyl-2,4,6-tris(3,5-ditertiobutyl-4-hydroxyphenyl)-benzene<br>Oxaldyhydrazide | 0.50<br>0.40<br>0.50 | 650 |
| 8 | Diaurylthiodipropionate<br>1,3,5-trimethyl-2,4,6-tris(3,5-ditertiobutyl-4-hydroxyphenyl)-benzene<br>Benzotriazole | 0.50<br>0.40<br>0.50 | 450 |
| 9 | Dilaurylthiodipropionate<br>1,3,5-trimethyl-2,4,6-tris(3,5-ditertiobutyl-4-hydroxyphenyl)-benzene<br>Oxanilide | 0.50<br>0.40<br>0.50 | 450 |

Comparison between Example 1 and Examples 4 and 5 shows the value of including the third ingredient, namely, phenol, in the formulation which includes a thiodipropionic acid ester and an organic phosphite. Comparison between Examples 2 and 4 illustrates the improvement which is secured when a phosphite is included in a stabilizing system which otherwise includes a thiodipropionic acid ester and a phenol. Comparison of Examples 5 to 9 with Example 3 shows respectively, in the case of using another phenol, the improvements secured by the addition of a phosphite, hydrazide, benzotriazole or oxanilide.

It will be apparent from the foregoing that improvement in heat stability of a polypropylene-asbestos mixture is secured by the combination of a particular series of materials as a stabilizing mixture.

It will be understood that changes may be made in the details of formulation and operation without departing from the spirit of the invention, especially as defined in the following claims.

We claim:
1. A thermoplastic composition having for its base a polypropylene of crystalline structure and containing asbestos in an amount within the range of 10% to 60% by weight and a stabilizing mixture consisting essentially of a phenol or a polyphenol in an amount within the range of 0.1% to 1% by weight, a thiodipropionic acid ester selected from the group consisting of dilaurylthiodipropionate, butylstearylthiodipropionate and benzyllaurylthiodipropionate in an amount within the range of 0.1% to 1% by weight and a compound selected from the group consisting of benzhydrazide, oxaldihydrazide, benzotriazole and oxanilide in an amount within the range of 0.1% to 1% by weight in which the stabilizing mixture is compatible with the polypropylene and has a low vapor tension at elevated temperature.

2. A thermoplastic composition as claimed in claim 1 in which the asbestos is chrysotile.

3. A composition as claimed in claim 2 in which the asbestos is of short fiber length.

4. A composition as claimed in claim 1 in which the asbestos is present in an amount within the range of 25% to 40% by weight of the composition.

5. A composition as claimed in claim 1 in which the phenol or polyphenol is selected from the group consisting of octadecyl-3-(3,5 - ditertiobutyl-4-hydroxyphenyl)-propionate, 1,3,5 - trimethyl-2,4,6-tris-(3,5-ditertiobutyl-4-hydroxyphenyl)-benzene, 4,4'-butylidene-bis-(6-tertiobutyl-m - cresol)-1,1,3-tris-(5-tertiobutyl-hydroxy - 2 - methylphenyl)-butane, 4,4'-thiobis-(6-tertiobutyl-m-cresol), tetraester obtained from propionic 3-(3,5-ditertiobutyl-4-hydroxyphenyl) acid and pentaerythritol.

6. A composition as claimed in claim 1 in which the thiodipropionic acid ester is selected from the group consisting of dilaurylthiodipropionate, butyl stearyl thiodipropionate and benzyl lauryl thiodipropionate.

7. A composition as claimed in claim 1 in which the hydrazide is selected from the group consisting of benzhydrazide and oxaldihydrazide.

8. A composition as claimed in claim 1 in which the triazole is benzotriazole.

9. A composition as claimed in claim 1 in which the oxamide is oxanilide.

References Cited

UNITED STATES PATENTS 3,074,910   1/1963   Dickson, Jr. ......... 260—45.85

FOREIGN PATENTS 945,441   12/1963   Great Britain ...... 260—45.85
1,235,047   5/1960   France ............ 260—45.85

OTHER REFERENCES

Chemical Abstracts, vol. 60: 14688b, 1963.
Chemical Abstracts, vol. 63: 18379f, 1965.
Use of Asbestos Reinforcement and Fillers, Hulbert, Jr., Modern Plastics Encyclopedia, 1967, pp. 595–597 relied on.
Chemical Abstracts, vol. 61: 14857c, 1966.

MORRIS LIEBMAN, Primary Examiner
S. L. FOX, Assistant Examiner

U.S. Cl. X.R.

260—45.85